United States Patent [19]

Sweeney et al.

[11] Patent Number: 4,586,853
[45] Date of Patent: May 6, 1986

[54] APPARATUS FOR THE RECLAMATION OF SLURRY FROM THE BOTTOM OF A STORAGE SILO

[75] Inventors: William T. Sweeney; Jeffrey L. Beck, both of Ponca City, Okla.

[73] Assignee: Conoco Inc., Ponca City, Okla.

[21] Appl. No.: 627,167

[22] Filed: Jul. 2, 1984

[51] Int. Cl.⁴ .................. B65G 53/30; B65G 53/66
[52] U.S. Cl. ................................. 406/14; 406/19; 406/103
[58] Field of Search ............ 406/14, 19, 30, 103, 406/109, 113, 115, 12, 142, 151, 152, 153, 137; 210/197

[56] References Cited

U.S. PATENT DOCUMENTS

| | | | |
|---|---|---|---|
| 691,706 | 1/1902 | Long | 210/197 |
| 3,275,149 | 9/1966 | Ludwig et al. | 210/197 X |
| 3,400,984 | 9/1984 | Shellene et al. | |
| 3,514,217 | 5/1970 | Reiss | |
| 3,545,618 | 12/1970 | Gregg et al. | 210/167 |
| 3,565,491 | 2/1971 | Frazier | 406/14 X |
| 3,617,094 | 11/1971 | Kester | |
| 3,621,593 | 11/1971 | Hickey | 37/57 |
| 3,870,373 | 3/1975 | Doerr et al. | |
| 3,942,841 | 3/1976 | McCain et al. | |
| 3,981,541 | 9/1976 | Doerr et al. | |
| 4,060,281 | 11/1977 | Doerr | |
| 4,143,921 | 3/1979 | Sweeney | |
| 4,265,572 | 5/1981 | Bourdois et al. | 406/152 X |
| 4,548,001 | 10/1985 | Link | 406/153 X |

Primary Examiner—Joseph F. Peters, Jr.
Assistant Examiner—Patrick N. Burkhart
Attorney, Agent, or Firm—William J. Miller; Cortlan R. Schupbach

[57] ABSTRACT

This is an improved apparatus used with a storage and reclamation apparatus which handles slurry formed of particulate matter and fluid. The reclaim apparatus includes a tank having a side wall and bottom. The slurry is added into the tank and is subsequently removed from the tank by a downwardly facing bell mouth coupled through a pipe to a pump. Fluidizing jets surround the bell mouth with a dilution control port mounted between the mouth and the pump. The dilution control port is connected to a second pump in series with a source of fluids. Process control apparatus measures the flow and density of the material being drawn into the mouth and adds or reduces dilution fluid in accordance with a set point so that a constant density is maintained at all times. The improved version accepts the overflow from the tank into a second tank which has a second bell mouth mounted at the bottom of the tank. Solids and fluids are sucked into the second bell mouth and used as the source of fluid for the dilution port of the first tank.

12 Claims, 2 Drawing Figures

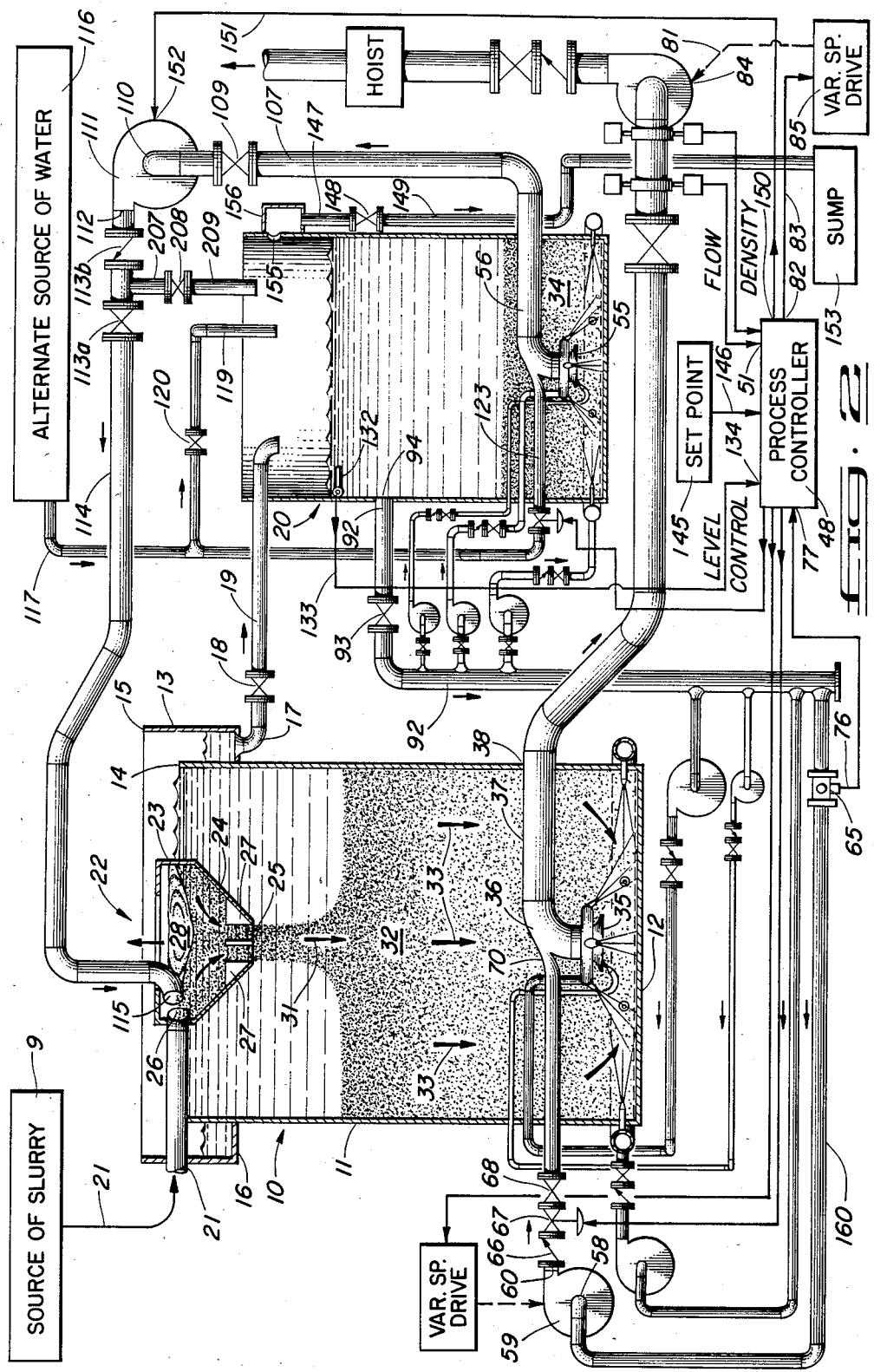

APPARATUS FOR THE RECLAMATION OF SLURRY FROM THE BOTTOM OF A STORAGE SILO

RELATED APPLICATIONS

This application is related to an application entitled "Apparatus for the Reclamation of Slurry from the Bottom of a Slurry Silo" filed on the same date as this application by Ronald L. Oda, Jeffrey L. Beck, Robert M. Blubaugh, Gary R. Harris, Ricky L. Shaw and Michael P. Evans.

DISCUSSION OF THE PRIOR ART

The prior art known to applicants can be divided into three general categories; first, that art dealing with the measurement of density in a pipeline with subsequent control attempting to correct density errors; second, vertical storage silo apparatus used in a mine to assist in the processing of slurry from a mine; and third, sumps other than vertical sumps useful for handling slurry in a mine.

In the first category are the patents to K. R. Shellene et al, U.S. Pat. No. 3,400,984 and L. P. Reiss, U.S. Pat. No. 3,514,217. These patents both deal with methods and apparatus for controlling the density of slurry in a pipeline. The Shellene patent adds fluid or removes fluid in attempting to control density.

The second group of patents are issued to Richard E. Doerr et al, U.S. Pat. No. 3,966,261; David L. McCain et al, U.S. Pat. No. 3,942,841; William T. Sweeney, U.S. Pat. No. 3,993,359; and Harold 0. Kester et al, U.S. Pat. No. 3,617,094. Each of the above patents discloses a vertical sump for the storage of slurry and the removal of the slurry being stored. The Sweeney patent discloses a jet type pump which removes slurry from a vertical tank and includes fluidizing jets to prevent clogging of the slurry in case it stands and becomes solidified. The patents to Doerr et al and McCain et al both disclose vertical storage tanks used for the storage of slurry in a mine. In these patents, however, the slurry is removed from the bottom of the tank either through the utilization of a pump or by gravity feed and subsequently removed by means of a pump. The patent to Kester discloses a portable slurry tank where the slurry is removed from the bottom by means of a pump sucking the material out of the tank.

U.S. Pat. Nos. 4,060,281; 3,981,541; 4,143,921; 3,870,373; and 3,545,618 all disclose various sumps useful in or out of a mine and the large reclamation sump which incorporates pumps either fixed or movable for removing slurry from the bottom of the sump.

BRIEF DESCRIPTION OF THE INVENTION

In the related application, an invention is disclosed which is an improved apparatus for providing temporary storage of slurry during mining operations and then reclaiming the slurry at a constant density for efficient transportation through subsequent apparatus such as a pipeline. In the previous patents, slurry density is generally controlled by moving the pump either vertically or horizontally in attempting to maintain a fairly constant density in the subsequent pipeline. Thus, if the density is decreased, the pump is trammed faster to pick up more material.

An apparatus similar to that disclosed in U.S. Pat. No. 4,143,921 was constructed in a mine, however, such an apparatus has distinct problems when the sump is placed underground. One distinct problem is the physical difficulty in excavating the mine floor and in supporting the mine roof so that a large horizontal sump can be fabricated underground. A second problem is the economical reliability of the apparatus used to remove the slurry, such apparatus requiring tracks above the sump for moving pumps and attendant housing and all of the other necessary features required to fill the sump in a uniform manner such as controlled hoppers which communicate the slurry from one location to another as the pump is reclaiming the slurry from the bottom of the sump.

The apparatus disclosed herein clearly simplifies the reclamation problems in a mine or in a mining operation either below or above ground. First, the addition of the slurry into the tank does not require any elaborate apparatus. Second, no moving apparatus such as pumps and the like are necessary to reclaim the slurry. Furthermore, a tank can be formed in the bottom of the mine floor as a vertical shaft thus greatly easing the complication of construction in the mine. Third, with no moving parts the mechanical difficulties are drastically reduced.

The related application comprises a vertical tank with apparatus at the top for introducing the slurry in a controlled manner. A bell mouth is placed at the bottom of the tank with the mouth directed toward the bottom of the tank. A pipe communicates with the bell mouth and exits the tank. A bell mouth, which is directed in a downwardly direction, will not plug when the tank is not used for an extended period of time and the slurry solidifies. To ease in the breakup of slurry, various fluidizing jets are incorporated around the bell mouth. First, fluidizing jets are directed downwardly toward the bottom. Second, fluidizing jets are incorporated at the bottom of the tank to move the slurry toward the bell mouth. Third, a fluidizing jet can be incorporated which is directed into the mouth for breaking any compacted particles which might occur at that location.

The density in the pipeline is measured by a densitometer attached to the pipeline after it exits the sump. A flow meter can be attached to the pipeline with the outputs from the flow meter and densitometer being applied to the input of a process controller. The density of the slurry being removed can be carefully controlled by adding fluid to the pipeline connecting the bell mouth with the pump used to remove the fluid from the tank. This fluid is added by a density controlled pump which has its input connected to a sump and its output connected to a pipe which is inputted to the interconnecting pipe.

In the preferred embodiment it is directed at the 90° elbow which couples the bell mouth to the horizontal portion of the pipe leaving the slurry tank. The amount of fluid being added by the pump can be controlled by either varying the speed of rotation of the density control pump or by controlling a valve between the density control pump and the port where the fluid is added to the interconnecting pipe, either or both of which is controlled from the output from the process controller. An overflow is provided at the top of the tank for excess fluids. The overflow is directed to a sump.

One of the problems with the previously disclosed invention is the handling of the solid material which passes out the overflow during the reclaim operation. The amount, size and density that passes out of the overflow is directly related to the flow rate over the overflow during its operation, that is, the higher the flow rate the more solid material passes over the overflow and into the overflow sump.

In order to handle the overflow solids material apparatus must be included in the sump for removing the solids such as a reclaim dredge or the like. In order to alleviate this problem, this invention discloses the use of a second reclaim tank similar in construction to the original reclaim tank. The overflow from the reclaim apparatus is directed into the second tank where the solids material settles to the bottom as in the first tank. A second bell mouth is mounted near the bottom of the second tank with its mouth directed toward the bottom of the second tank with the output communicated to the source of fluids for the dilution port of the first tank. The solids material, which would normally be very fine material, will be sucked up by the second bell mouth and injected along with the fluid in the second tank as the dilution fluid for the first tank. The process control apparatus can determine the density of the material leaving the first tank and adjust the addition of dilution material accordingly. Since the velocity of any overflow material leaving the second tank will be very low, two substantial benefits accrue. First, the material in the second tank will have adequate time to settle; and second, the velocity leaving the second tank will be extremely low. Any solids material passing out of the overflow from the second tank will be fine enough that any pump can remove them from the sump; however, under normal operation, it is anticipated that very little, if any, overflow will pass from the second tank to a reclaim sump.

BRIEF DESCRIPTION OF THE FIGURES

FIG. 2 illustrates a second embodiment where the solids material from the second tank is removed and deposited as a slurry input to the first tank.

DETAILED DESCRIPTION OF THE INVENTION

Figure 1:
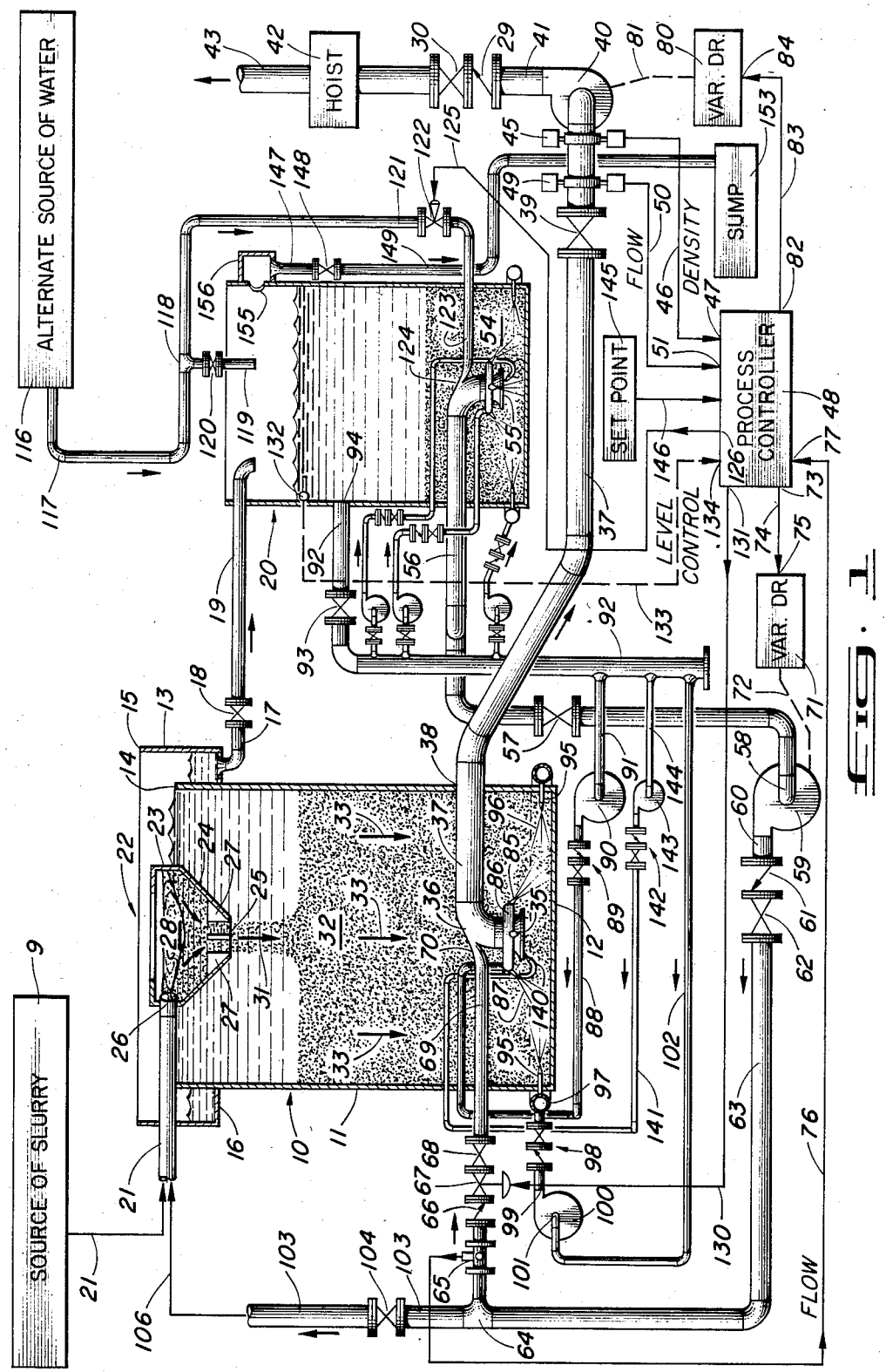
FIG. 1 is a preferred embodiment of the invention illustrating the second reclaim tank coupled to the first reclaim tank with the solids material from the second reclaim tank being injected into the dilution port of the first tank.

Referring to all of the figures but in particular to FIG. 1, a slurry tank referred to by arrow 10 includes side wall 11 and a bottom 12. The side wall and bottom can be made of metal, cement or any other convenient material. The material actually used will depend upon where it is installed and the convenience of getting the particular material to the installation location. Overflow means is provided by an enlarged portion 13 surrounding the top 14 of tank 10 and having a top 15 higher than top 14 of tank 10. Portion 13 has a bottom 16 which encloses portion 13 to the escape of fluids. An overflow pipe 17 passes through a shutoff valve 18 and to subsequent pipe 19 which is coupled to a second reclaim tank referred to by arrow 20. Slurry is inputted from one mine face 9, for example, through pipe 21 to an inlet apparatus generally referred to by arrow 22. The inlet apparatus is anchored in any means such as bracing members (not shown) to tank side wall 11, enlarged portion 13, or the mine roof (not illustrated). Inlet apparatus 22 basically functions to remove the turbulence and entrapped air from a high velocity line 21 entering tank 10, and generally is constructed of a cylindrical portion 23 and a conical portion 24 with an outlet 25. The fluids entering inlet apparatus from pipe 21 will generally be directed by means of the outlet 26 from pipe 21 so that it swirls around inlet apparatus 22. This prevents the material from splashing over the top and eliminates other problems. In order to reduce the swirl and thus reduce the turbulence inside tank 10, a plurality of vanes 27 is affixed to conical portion 24 in a manner to slow or stop the rotation of slurry 28 inside inlet apparatus 22. Only one slurry inlet pipe 21 is disclosed. It is obvious that many more can be incorporated from other mine faces.

Once slurry 28 is slowed by vanes 27, it drops in the direction of arrow 31 to a bed of slurry 32 which settles in the direction of arrows 33.

The inlet portion 22 disclosed herein is the subject of a copending application and is specifically disclaimed herein as part of this invention.

The removal of the slurry is accomplished by apparatus comprising a bell mouth 35 which communicates with a 90° elbow 36 with a horizontal pipe 37 which passes out an opening 38 in side wall 11 through a shutoff valve 39 to slurry pump 40. The output of pump 40 is connected to a pipe 41 which may be coupled to a hoist apparatus 42 if tank 10 is at a depth more than the final destination of the slurry. Hoist 42 communicates with a pipe 43 to the final destination of the slurry such as a preparation plant if the slurry were coal and water. It is obvious that, if the tank 10 is located on the surface, a hoist apparatus would not be necessary. Under these conditions pump 40 would communicate directly to pipe 41 which would be connected to the end use apparatus for the slurry and not to a hoist. Check valve 29 and cutoff valve 30 may be added as necessary.

In order to measure density of the slurry being communicated through pipe 37 to pump 40, density measuring apparatus 45 is attached in series with pipe 37 and has an output coupled through wire 46 to input 47 of process controller 48. A flow meter 49 is coupled through a wire 50 to an input 51 of process controller 48.

A second bell mouth 55 is coupled through pipe 56 through cutoff valve 57 to inlet 58 of pump 59. An outlet 60 of pump 59 is coupled through a check valve 61 and cutoff valve 62 to a pipe 63. Pipe 63 is coupled to a tee 64. One branch of tee 64 passes through a flow meter 65 to check valve 66, a control valve 67 a cutoff valve 68, and to a pipe 69 which is connected to a dilution port 70 in the 90° elbow 36 which couples bell mouth 35 to pipe 37. A variable speed drive 71 is coupled mechanically through linkage 72 to the shaft of the impeller of pump 59. Process controller 48 has an output 73 which is coupled through wire 74 to the input 75 of variable speed drive 71. Flow meter 65 is coupled through a wire 76 to the input 77 of process controller 48. Pump 40, likewise, has a variable speed drive 80 coupled through mechanical linkage 81 to the impeller shaft of pump 40. The variable speed drive 80 is controlled from the output 82 of process controller 48 which is coupled by wire 83 to the input 84 of variable speed drive 80.

In order to properly fluidize the material being removed from tank 10, several fluidizing jets are provided. A first set of fluidizing jets 85 is attached to a manifold 86. Jets 85 direct a spray into the coal bed 32 as illustrated by line 87. Manifold 86 is coupled through a pipe 88 and necessary check and cutoff valve 89 to a pump 90. The input of pump 90 is coupled through pipe 91 to a pipe 92. Pipe 92 is connected through a cutoff valve 93 to a port 94 in tank 20. Fluidizing jets 95 direct a spray as illustrated by lines 96. Jets 95 are coupled to a manifold 97 through necessary cutoff and check valve 98 to the output 99 of pump 100. The input 101 of pump 100 is coupled through a pipe 102 to pipe 92.

The other arm of tee 64 is coupled through a pipe 103 and cutoff valve 104 through a continuation of pipe 103 and can be applied as a second input 106 to inlet apparatus 22. If needed, an alternate source of water 116 can be supplied through a pipe 117 to tee 118 which can go both in the direction of pipe 119 as added water into tank 20 which is controlled by valve 120 or as a dilution fluid which is supplied through pipe 121, control valve 122 to pipe 123 and finally to dilution port 124. Valve 122 is controlled through wire 125 which is connected to an output 126 of process controller 48. The dilution port 70 as previously discussed has its fluid controlled by valve 67 which is coupled through a wire 130 to an output 131 of process controller 48. The level of tank 20 is continuously monitored by some form of level sensor. The height of the water may be controlled by use of the level sensing device 132 which is coupled through a wire 133 to an input 134 to process controller 48. If additional water needs to be added, then valve 120 can be opened, either manually or automatically by a signal from process controller 48. Level sensing device 132 will either control the closure of valve 120 when the proper level is reached or the valve can be manually closed.

Overflow from tank 20 is provided by a collection region 156 which communicates with tank 20 through port 155 and with a sump 153 through a pipe 147, valve 148 and pipe 149.

A third fluidizing apparatus illustrated in tank 10 comprises a jet 140 directed into bell mouth 35. This fluidizing jet is generally not needed and is subsequently not considered necessary to the operation of the apparatus but is included in case the bell mouth should become plugged. The jet is preferably of the type that is self-cleaning, particularly since it faces up and tends to become easily plugged. It may be coupled through a pipe 141 through valves 142 to pump 143. Pump 143 is subsequently connected to pipe 144 and finally to pipe 92. In tank 20 similar fluidizing jets are included and as a consequence they will not be discussed since they operate functionally in the identical manner as the fluidizing jets described in tank 10.

Process controller 48 has a box 145 labeled "set point." This is generally a feature which permits the operator to determine one or more control conditions for the process controller 48 and is coupled through connection 146 to a process controller 48. The set point is generally included in the process controller as a portion of the controller. The set point, for example, will determine the proper level of fluid in tank 20, the proper flow rate through hoist apparatus pipe 43, the density in pipe 37 and other necessary features to the operation of the apparatus as will be subsequently described. The process controller may comprise a single unit or several units as needed for the various controls necessary for the proper operation of the system.

Operation of the Device of FIG. 1

Material from any source of slurry which can be an underground mine face or a surface mine face generates material suspended in fluid which is communicated through pipe 21 to inlet apparatus 22. The type of material can be coal, phosphate, iron ore or any material that can be slurried. For the sake of simplicity the description will be limited to that of coal; however, the application and apparatus are not so limited.

Slurry entering pipe 21 as previously described enters inlet apparatus 22 through outlet 26. It must be added into tank 10 with as little turbulence as possible so that bed 32 is not stirred up to the point where an excessive amount of particulate matter passes over the top 14 of tank 10. Furthermore it cannot be added with such turbulence that it spills over the top of inlet apparatus 22 creating a substantial turbulence at the surface of the fluid in tank 10 thus causing large particulate matter to pass over the top of tank 10. As it enters inlet apparatus 22, it swirls around as illustrated by the drawing and strikes vanes 27 which are in the direction of the fluid. This causes the material to stop its swirl and fall out of the bottom of inlet apparatus 22. The centrifugal force created by the swirl or vortex also removes any entrapped air in the slurry being added. The diameter of the outlet 25 is quite large and is designed to provide a low velocity outlet. Furthermore, inlet apparatus 22 is submerged in the fluids in tank 10 to further reduce the turbulence generated by the entry of material from outlet 26. As the material falls in the direction of arrow 31 it creates bed 32 in the bottom of tank 10. It continues to settle in the direction of arrows 33. In order to remove the material for subsequent transmission to the hoist apparatus, pump 40 is energized through variable drive 80 and mechanical linkage 81 causing a suction in pipe 37 and a subsequent suction in bell mouth 35. Material will then begin to pass up in the bell mouth passing through pipe 37 and past flow meter 49 and densitometer 45. Both the flow and density will be measured by meters 49 and 45, respectively, and the results communicated through wires 50 and 46, respectively, to input 51 and 47, respectively, of process controller 48. Process controller 48 then samples both the flow and density being measured and compares it to the set point value in 145. If the density is proper, no change is made to the signal communicated through output 131 to wire 130. If an error is determined, the signal communicated will be changed dependent upon the error detected. If the density is too high, the signal outputted at output 131 to control valve 67 will change so that the valve will open passing more fluids through pipe 69 to port 70 adding diluent to the fluids being sucked into pipe 37.

This invention relates to a method for obtaining diluent fluid as well as a method to dispose of the particulate material which passes over the top 14 of tank 10. The material passing over top 14 will pass through overflow pipe 17, valve 18, and subsequent pipe 19 for deposit into tank 20. The amount of solids in tank 20 will be determined in part by the velocity of the fluids passing over the top 14 of tank 10. Under some conditions the amount of material can be substantial and can be in the excess of 35 tons per hour. The material passes through pipe 19 and into tank 20 and will settle to the bottom in the same manner as the material settled in tank 10 as illustrated by arrows 33. The nature of material in tank 20 will be different from tank 10 in that it will generally be of a smaller diameter, for example one millimeter in diameter or less. Since the material is fine, it can be used as a diluent for the material being removed through pipe 37 of tank 10. Furthermore, it can be disposed of completely by sucking it out of tank 20 through bell mouth 55, through pipe 56 and cutoff valve 57 to pump 59 which communicates through outlet 60 to pipe 63, flow meter 65, valves 66, 67 and 68 to port 70. The material being drawn into bell mouth 55 can be controlled in two ways. First, its flow can be detected by flow meter 65 which is coupled through wire 76 to the input 77 of process controller 48. Secondly, as previously mentioned, the output density and flow can be determined by densitometer 45 and flow meter 49. The process controller normally would control the flow as previously discussed by generating an output signal at outlet 131 through wire 130 to valve 67. One of the useful functions of flow meter 65 is to anticipate the subsequent setting for both valves 67 and rotation speed of pump 40. The flow as measured by flow meter 65 can be carefully controlled as required by process controller 48 by a signal on output 73 through wire 74 to input 75 of variable speed drive 71 which can communicate a required change in pump speed in response to a change in the flow from a predetermined set point, to linkage 72 and to the impeller of pump 59; therefore, if additional flow is required through port 70, the process controller can communicate a correspondingly increased signal to the variable speed drive 71 to increase its rotation thus increasing the flow of fluids through pipe 63. If this increase in flow of fluids causes the fluid level to drop too far in tank 20, level indicator 132 will communicate this fact to input 134 of process controller 48. Additional fluids can then be transferred from the alternate source of water 116 to pipe 117 to pipe 119 by opening valve 120. Valve 120 has not been shown as being controlled by process controller 48. It is obvious that any valve can be controlled by process controller 48. Thus level changes indicated by level control 132 can be communicated as previously described by process controller 48 and process controller 48 can then communicate this to valve 120 adding water to tank 20.

During the initial startup of the system, tank 20 can have a significant quantity of solid material settled to the bottom. Thus the dilution fluids being drawn into bell mouth 55 can substantially exceed the normal density of material drawn into bell mouth 55. Under these conditions, it might be necessary to dilute part of the fluids being drawn into bell mouth 55 so that proper control of the density can be achieved in pipe 37 as quickly as possible during the start procedure. Dilution fluids under these conditions can be monitored and added by a signal from the process controller being applied to output 126 through wire 125 to valve 122; therefore, if the density being drawn into bell mouth 55 is too high, valve 122 can be opened by an amount necessary to reduce the density of the fluids to an acceptable level. A densitometer is not shown on pipe 56, pipe 63 or any of the pipes going directly into port 70. It is obvious from the copending applications that the density of this line can be carefully controlled if desired by the inclusion of a densitometer. If fluid in tank 10 begins to drop below an acceptable level and yet the density being drawn through pipe 37 is the minimum desired to be pumped, fluids must be added to tank 10 without changing the density of the fluid being drawn through pipe 37. In order to accomplish the above, valve 104 in pipe 103 can be opened, causing additional water to flow through second input 106 to input apparatus 22 and into tank 10. In the above manner fluids can also be added passing the fluids through dilution port 70. Fluids may accumulate in tank 20 on occasions which will require removal of fluids to a temporary sump. This provision is accomplished by port 155 which communicates with collection region 156 which communicates with down pipe 147, cutoff valve 148 and another pipe 149 to sump 153.

Referring to FIG. 2 a modified embodiment is illustrated. Similar numbers will be used for similar elements in FIG. 2. The basic difference between the device illustrated in FIG. 2 and that in FIG. 1 is the means for transferring the solids from tank 20 to tank 10. In FIG. 1 the solids were transferred by sucking them into mouth 55 through pipe 56 pump 59 pipe 63 and into dilution port 70. This scheme provided for removing solids completely out of the systems without recirculating them in tank 20. FIG. 2 illustrates a method for recirculating the solids by transferring the solids from tank 20 to tank 10 and depositing them along with the slurry from the mine face being received through pipe 21. To accomplish the above the solids in bed 34 in tank 20 are drawn into mouth 55 through pipe 56 which is coupled directly to pipe 107. Material will then pass through cutoff valve 109 to the input 110 of pump 111. It is then outputted at 112 through valve and cutoff apparatus 113a and 113b, respectively, to pipe 114 where it is inputted into inlet apparatus 22 at port 115. The solids and fluids drawn into mouth 55 will then be deposited along with material from the source of slurry at pipe 21 which is also deposited into inlet apparatus 22 at port 26. During startup or at other times to agitate material in tank 20, it may be advantageous to recirculate material in tank 20 only. For this purpose a pipe 207 is coupled through a valve 208 to pipe 209 which empties into tank 20.

The system shown in FIG. 2 is not as efficient as the system shown in FIG. 1, since it will require recirculation of the solids on a continuing basis since some will again overflow over the top 14 of tank 10 and back through pipe 17, valve 18 and pipe 19 into tank 20. The level control 132 will function as previously described by its communication through wire 133 to to input 134 of process controller 48. The apparatus in tank 10 which comprises the bell mouth 35, elbow 36 and removal pipe 37 differs from that shown in FIG. 1 in that the fluids for port 70 are received by withdrawing fluid through port 94 in tank 20 through pipe 92, valve 93 and a continuation of pipe 92 to pipe 160 which includes flow meter 65 coupled through wire 76 to input 77 of process controller 48 as described in FIG. 1. Pipe 160 is connected to inlet 58 of pump 59 which is connected from its output 60 to the above described valving systems 66, 67 and 68. Overflow from tank 20, if it should occur, passes through an opening 155 down into collection region 156 to pipe 147 cutoff valve 148 and pipe 149 to sump 153.

The system of FIG. 2 operates in the following manner:

Tank 10 functions in the identical manner as that described in FIG. 1 and will not be further described. As the material accumulates through overflow over the top 14 of tank 10 down pipes 17 and 19 to tank 20, it accumulates as previously described as a bed of solids 34 in tank 20. These solids are then sucked up by mouth 55 into pipe 56 up pipe 107 to the inlet 110 of pump 111. They are then transferred under pressure to outlet 112 through check valve 113b and valve 113a and pipe 114 to inlet apparatus 22 by exiting from input 115. If recirculation is desired or necessary, valve 113a is closed and valve 208 is opened. Material is then sucked into mouth 55 through pipes 56 and 107, valve 109, pump 111, down pipe 207, valve 208 and pipe 209 to tank 20. The above process will keep all of the fines in suspension. Once the system is in use, the tank will probably have sufficient agitation to keep the solids in suspension.

When the above occurs, valve 208 is closed and valve 113a is opened. Here the material enters tank 10 in the identical manner as other slurry inputs as illustrated by pipe 21 with outlet 26. It is obvious, of course, that any material which enters inlet apparatus 22 will settle in the direction of arrows 33 as previously described onto bed 32; however, a certain small percentage will pass over the top 14 of tank 10 and overflow to the tank 20. The system may, however, provide a slightly better control over the density of material in pipe 37, since it will not be mixed with solids from tank 20. It will be slightly less efficient, however, as a certain percentage of the material will be recirculated between tank 10 and tank 20.

It is obvious that other combinations can be utilized in the transfer of material from tank 20 to tank 10, and such obvious combinations are well within the scope of the specification and appended claims.

What is claimed is:

1. In combination with a storage and reclaim apparatus for handling slurry formed of particulate matter and fluids, wherein said storage and reclaim apparatus includes a first tank means having side wall means and a bottom, means for adding said slurry to said first tank means, a rigidly mounted and downwardly facing mouth spaced from the bottom of said first tank and coupled through a pipe through said side wall means to a pump means, fluidizing jet surrounding said mouth, a dilution control port means mounted in said pipe between said mouth and said side wall means including a dilution control means connecting said dilution control port means to a source of fluid, and an overflow means, said pump means connected to an outlet for disposal of said slurry, an improvement comprising:

a second tank means having a side wall means and a bottom, means for coupling said overflow means to said second tank means, second mouth means mounted in said second tank means and facing said second bottom, means coupled to said second mouth means to move material from the bottom of said second tank means to said first tank means, whereby overflow fluids and particulate material from said first tank means is deposited into said second tank means and drawn from said second tank means and recycled into said first tank means, with at least a portion of said overflow fluids and particulate material inputted as a source of fluid into said dilution control port means.

2. Apparatus as described in claim 1 characterized in that a density measuring means having an output is mounted to said pipe coupling said mouth to said pump means; a flow measuring means having an output is mounted to said means coupling said second mouth means to said dilution control port means; process control means having inputs and an output and means coupling said density measuring means output and said flow measuring means output to said process control means inputs; and means coupling said output from said process control means to said dilution control means.

3. Apparatus as described in claim 1 wherein said means coupled to move material from the bottom of said second tank means to said first tank means is inputted to said means for adding slurry to said first tank means.

4. Apparatus as described in claim 3 wherein said means coupled to move material includes a bypass for returning said material to said second tank means.

5. Apparatus according to claim 3 wherein said source of fluid is from said second tank means.

6. Apparatus according to claim 4 wherein said source of fluid is from said second tank means.

7. Apparatus as described in claim 3, wherein a second flow meter means having an output is mounted to said pipe coupling said mouth to said pump means, and wherein said output is coupled as one of said inputs to said process control means.

8. In a storage and reclaim apparatus for handling slurry formed of particulate matter and fluids, wherein said storage and reclaim apparatus includes a first tank means having a side wall and a bottom, means for adding said slurry to said first tank means, a rigidly mounted, downwardly facing mouth spaced from the bottom of said first tank means and coupled through a pipe to a pump, fluidizing jet means surrounding said mouth, a dilution control port means mounted in said pipe between said mouth and said side wall with a second pump means mounted in series with a source of fluids and said dilution control port means, and an overflow means, an improvement comprising:

a second tank means having a side wall and a second bottom, means for coupling said overflow means to said second tank means, mouth means mounted in said second tank means and facing said second bottom; means coupled to said second mouth means to move material form the bottom of said second tank means as said source of fluid for said second pump means, whereby overflow fluids and particulate material from said first tank means is deposited into said second tank means and drawn from said second tanks means and injected as fluid into said dilution control port means in said reclaim apparatus.

9. Apparatus as described in claims 1, 2, 3, or 8 characterized in that said second tank means has a fluid level and a fluid and solid interface level, means for removing fluids from said second tank between said fluid level and said fluid and solid interface level, and means communicating said removed fluid to said fluidizing jet means.

10. Apparatus as described in claim 9 wherein said second tank means includes fluidizing jet means and wherein said removed fluids communicate with said fluidizing jet means in said second tank means.

11. Apparatus as described in claim 8 wherein said second pump means is driven by a variable speed drive means, including means for controlling said variable speed drive means; means for measuring the density of fluids from said mouth means; process control means having an input means and an output means; means for coupling the output from said means for measuring said density to the input means of said process controller; and means for coupling the output of said process controller to said means for controlling said variable speed drive.

12. Apparatus as described in claim 11 including a means for measuring flow through said means coupled to move material from the bottom of said second tank means as said source of fluids, said means for measuring flow generating an output signal coupled to said input means of said process control means.

* * * * *